(12) United States Patent
Luharuka et al.

(10) Patent No.: US 10,895,114 B2
(45) Date of Patent: Jan. 19, 2021

(54) SYSTEM AND METHOD FOR DELIVERY OF OILFIELD MATERIALS

(71) Applicant: Schlumberger Technology Corporation, Sugar Land, TX (US)

(72) Inventors: Rajesh Luharuka, Katy, TX (US); Laurent Coquilleau, Houston, TX (US); Dennis Jay Johnson, Rosenberg, TX (US); William Troy Huey, Fulshear, TX (US); Hau Nguyen-Phuc Pham, Houston, TX (US); Nikki Morrison, Houston, TX (US); Jakub Pawel Jodlowski, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 426 days.

(21) Appl. No.: 13/836,405

(22) Filed: Mar. 15, 2013

(65) Prior Publication Data

US 2014/0044508 A1    Feb. 13, 2014

Related U.S. Application Data

(60) Provisional application No. 61/682,734, filed on Aug. 13, 2012, provisional application No. 61/746,154, (Continued)

(51) Int. Cl.
   *E04H 7/22*      (2006.01)
   *E21B 15/00*    (2006.01)
     (Continued)

(52) U.S. Cl.
CPC .............. *E21B 15/00* (2013.01); *B65G 65/32* (2013.01); *E04H 7/22* (2013.01); *E21B 41/00* (2013.01)

(58) Field of Classification Search
CPC ..................................................... E04H 7/22
(Continued)

(56) References Cited

U.S. PATENT DOCUMENTS

| 559,965 A | 5/1896 | Bierstadt |
| 896,233 A | 8/1908 | McQueen |

(Continued)

FOREIGN PATENT DOCUMENTS

| CA | 2552581 C | 2/2009 |
| CA | 2643743 C | 4/2011 |

(Continued)

OTHER PUBLICATIONS

International Search Report and Written Opinion dated Oct. 25, 2013 for International Patent Application No. PCT/US2013/054283, 12 pages total.

(Continued)

*Primary Examiner* — David L Sorkin
(74) *Attorney, Agent, or Firm* — Rodney Warfford

(57) ABSTRACT

A system and methodology facilitates the handling of oilfield materials in a space efficient manner. The oilfield materials are delivered without blowers to at least one modular silo. Each modular silo comprises an outer housing defining an enclosed interior. A vertical conveyor is positioned within the enclosed interior and is used to lift the oilfield material from a silo inlet to an upper portion of the modular silo without utilizing airflow to carry the oilfield materials. Once the oilfield materials are disposed within the upright modular silo, the outflow of oilfield materials through a silo outlet may be controlled so as to selectively release the desired amount of material into a blender or other suitable equipment.

23 Claims, 8 Drawing Sheets

Related U.S. Application Data filed on Dec. 27, 2012, provisional application No. 61/746,158, filed on Dec. 27, 2012.

(51) Int. Cl.
*E21B 41/00* (2006.01)
*B65G 65/32* (2006.01)

(58) Field of Classification Search
USPC .............................................. 366/30, 35, 38
See application file for complete search history.

(56) References Cited

U.S. PATENT DOCUMENTS

| | | | |
|---|---|---|---|
| 1,526,527 A | 2/1925 | Butler | |
| 1,560,826 A | 11/1925 | Lester | |
| 1,576,940 A | 3/1926 | Arthur | |
| 2,073,652 A | 3/1937 | Robb | |
| 2,099,898 A | 11/1937 | Larkin | |
| 2,357,583 A | 9/1944 | Franco | |
| 2,735,839 A | 2/1956 | Schrenk | |
| 2,774,497 A | 12/1956 | Martin | |
| 2,792,262 A | 5/1957 | Hathorn | |
| 2,858,950 A | 11/1958 | Martin | |
| 3,155,248 A | 11/1964 | Haller | |
| 3,170,560 A | 2/1965 | Obmascher | |
| 3,208,616 A | 9/1965 | Haskins | |
| 3,263,436 A * | 8/1966 | Goldfarb | B28C 7/0038 34/403 |
| 3,314,557 A | 4/1967 | Sackett | |
| 3,394,961 A | 7/1968 | Gedeon | |
| 3,451,986 A | 6/1969 | Metais | |
| 3,490,632 A | 1/1970 | McKinney | |
| 3,497,327 A | 2/1970 | Kehse | |
| 3,560,053 A | 2/1971 | Ortloff | |
| 3,618,801 A | 11/1971 | Blanchard | |
| 3,666,129 A | 5/1972 | Haskins | |
| 3,687,319 A | 8/1972 | Adam et al. | |
| 3,743,108 A | 7/1973 | Visser | |
| 3,756,443 A | 9/1973 | Verschage et al. | |
| 3,787,479 A | 1/1974 | Grehl et al. | |
| 3,842,910 A | 10/1974 | Zingg et al. | |
| 3,883,019 A | 5/1975 | Hansen, Jr. | |
| 3,883,148 A | 5/1975 | Miller | |
| 3,894,645 A | 7/1975 | Verschage | |
| 3,938,673 A * | 2/1976 | Perry, Jr. | B28C 7/049 366/142 |
| 3,974,602 A | 8/1976 | Pohl et al. | |
| 3,985,254 A | 10/1976 | Grandury | |
| 3,998,433 A | 12/1976 | Iwako | |
| 4,026,441 A | 5/1977 | Jones | |
| 4,077,612 A | 3/1978 | Ricciardi | |
| 4,079,150 A * | 3/1978 | Beck | A23K 30/15 426/54 |
| 4,090,623 A | 5/1978 | Noyon | |
| 4,103,793 A | 8/1978 | Weaver | |
| 4,111,314 A | 9/1978 | Nelson | |
| 4,187,047 A | 2/1980 | Squifflet, Sr. | |
| 4,209,278 A | 6/1980 | Cooper et al. | |
| 4,222,498 A | 9/1980 | Brock | |
| 4,248,359 A | 2/1981 | Brock | |
| 4,249,848 A | 2/1981 | Griffin et al. | |
| 4,268,208 A | 5/1981 | Hankins et al. | |
| 4,337,014 A | 6/1982 | Farnham | |
| 4,348,146 A | 9/1982 | Brock | |
| 4,373,857 A | 2/1983 | Giles | |
| 4,375,343 A | 3/1983 | Butler | |
| 4,400,126 A | 8/1983 | Desourdy | |
| 4,427,133 A | 1/1984 | Kierbow et al. | |
| 4,453,829 A | 6/1984 | Althouse, III | |
| 4,465,420 A | 8/1984 | Dillman | |
| 4,561,821 A | 12/1985 | Dillman | |
| 4,579,496 A * | 4/1986 | Gerlach | B28C 7/0495 366/18 |
| 4,601,628 A | 7/1986 | Lowing | |
| 4,621,972 A | 11/1986 | Grotte | |
| 4,626,166 A | 12/1986 | Jolly | |
| 4,671,665 A | 6/1987 | McIntire | |
| 4,701,095 A | 10/1987 | Berryman et al. | |
| 4,775,275 A | 10/1988 | Perry | |
| 4,808,004 A | 2/1989 | McIntire et al. | |
| 4,832,561 A | 5/1989 | Nijenhuis | |
| 4,850,750 A | 7/1989 | Cogbill et al. | |
| 4,855,960 A | 8/1989 | Janssen et al. | |
| 4,883,363 A | 11/1989 | Pillon et al. | |
| 4,899,832 A | 2/1990 | Bierscheid | |
| 4,907,712 A | 3/1990 | Stempin | |
| 4,917,560 A | 4/1990 | Murray et al. | |
| 4,925,358 A | 5/1990 | Cook | |
| 4,944,646 A | 7/1990 | Edwards et al. | |
| 5,006,034 A | 4/1991 | Bragg et al. | |
| 5,018,932 A | 5/1991 | Croisier | |
| 5,035,269 A | 7/1991 | Pytryga et al. | |
| 5,046,856 A | 9/1991 | McIntire | |
| 5,052,486 A | 10/1991 | Wilson | |
| 5,121,989 A | 6/1992 | Horton et al. | |
| 5,190,374 A | 3/1993 | Harms et al. | |
| 5,195,861 A | 3/1993 | Handke | |
| 5,201,498 A | 4/1993 | Akins | |
| 5,236,261 A | 8/1993 | Hagenbuch | |
| 5,339,996 A | 8/1994 | Dubbert et al. | |
| 5,362,193 A | 11/1994 | Milstead | |
| 5,382,411 A | 1/1995 | Allen | |
| 5,387,736 A | 2/1995 | Salomone et al. | |
| 5,413,154 A | 5/1995 | Hurst et al. | |
| 5,426,137 A | 6/1995 | Allen | |
| 5,427,497 A | 6/1995 | Dillman | |
| 5,571,281 A | 11/1996 | Allen | |
| 5,667,298 A | 9/1997 | Musil et al. | |
| 5,775,713 A | 7/1998 | Peterson et al. | |
| 5,777,234 A | 7/1998 | Kosmal | |
| 5,785,421 A | 7/1998 | Milek | |
| 5,795,062 A | 8/1998 | Johnson | |
| 5,822,930 A | 10/1998 | Klein | |
| 6,000,840 A | 12/1999 | Paterson | |
| 6,050,743 A | 4/2000 | Medinger | |
| 6,186,195 B1 | 2/2001 | Anstotz | |
| 6,186,654 B1 * | 2/2001 | Gunteret, Jr. | B01F 5/265 366/18 |
| 6,193,402 B1 | 2/2001 | Grimland et al. | |
| 6,286,986 B2 | 9/2001 | Grimland et al. | |
| 6,293,689 B1 | 9/2001 | Guntert, Jr. et al. | |
| 6,447,674 B1 | 9/2002 | Simon et al. | |
| 6,474,926 B2 | 11/2002 | Weiss | |
| 6,491,421 B2 | 12/2002 | Rondeau et al. | |
| 6,527,428 B2 | 3/2003 | Guntert, Jr. et al. | |
| 6,832,851 B1 | 12/2004 | Von Wilcken | |
| 6,939,031 B2 | 9/2005 | Pham et al. | |
| 6,948,535 B2 | 9/2005 | Stegemoeller | |
| 7,048,432 B2 | 5/2006 | Phillippi et al. | |
| 7,104,328 B2 | 9/2006 | Phillippi et al. | |
| 7,214,028 B2 | 5/2007 | Boasso et al. | |
| 7,258,522 B2 | 8/2007 | Pham et al. | |
| 7,308,953 B2 | 12/2007 | Barnes | |
| 7,419,296 B2 | 9/2008 | Allen | |
| 7,540,308 B2 | 6/2009 | Pessin et al. | |
| 7,614,451 B2 | 11/2009 | Blaschke et al. | |
| 7,703,518 B2 | 4/2010 | Phillippi et al. | |
| 7,815,222 B2 | 10/2010 | Markham | |
| 7,836,949 B2 | 11/2010 | Dykstra | |
| 7,837,427 B2 | 11/2010 | Beckel et al. | |
| 7,841,394 B2 | 11/2010 | McNeel et al. | |
| 7,845,413 B2 | 12/2010 | Shampine et al. | |
| 7,866,881 B2 | 1/2011 | El Kholy et al. | |
| 7,921,914 B2 | 4/2011 | Bruins et al. | |
| 7,926,564 B2 | 4/2011 | Phillippi et al. | |
| 7,931,088 B2 | 4/2011 | Stegemoeller et al. | |
| 8,066,955 B2 | 11/2011 | Pinchot | |
| 8,083,083 B1 | 12/2011 | Mohns | |
| 8,127,844 B2 | 3/2012 | Luharuka et al. | |
| 8,137,051 B2 | 3/2012 | Glenn et al. | |
| 8,142,134 B2 | 3/2012 | Lavoie et al. | |
| 8,146,665 B2 | 4/2012 | Neal | |
| 8,313,269 B2 | 11/2012 | Fisher et al. | |

(56) References Cited

U.S. PATENT DOCUMENTS

| | | |
|---|---|---|
| 8,354,602 B2 | 1/2013 | Lucas et al. |
| 8,585,341 B1 | 11/2013 | Oren et al. |
| 8,661,743 B2 | 3/2014 | Flusche |
| 8,726,584 B1 | 5/2014 | Nolte et al. |
| 8,926,252 B2 | 1/2015 | McIver et al. |
| 8,931,996 B2 | 1/2015 | Friesen et al. |
| 9,017,001 B1 | 4/2015 | Dueck |
| 9,097,033 B2 | 8/2015 | Margevicius et al. |
| 9,457,335 B2 | 10/2016 | Pham et al. |
| 9,475,029 B2 | 10/2016 | McSpadden et al. |
| 9,663,303 B2 | 5/2017 | Waldner et al. |
| 9,688,178 B2 | 6/2017 | Pham |
| 2002/0034120 A1 | 3/2002 | Guntert, Jr. et al. |
| 2002/0147370 A1 | 10/2002 | Hinz et al. |
| 2003/0150494 A1 | 8/2003 | Morgan et al. |
| 2003/0161212 A1 | 8/2003 | Neal et al. |
| 2003/0196809 A1 | 10/2003 | Willberg et al. |
| 2003/0202869 A1 | 10/2003 | Posch |
| 2003/0227817 A1 | 12/2003 | Martel et al. |
| 2004/0008571 A1 | 1/2004 | Coody et al. |
| 2004/0209780 A1 | 10/2004 | Harris et al. |
| 2004/0256106 A1 | 12/2004 | Phillippi et al. |
| 2005/0028979 A1 | 2/2005 | Brannon et al. |
| 2005/0067351 A1 | 3/2005 | Graham |
| 2005/0091941 A1 | 5/2005 | Baird |
| 2005/0123385 A1 | 6/2005 | Kirsch |
| 2005/0201197 A1 | 9/2005 | Duell et al. |
| 2006/0028914 A1 | 2/2006 | Phillippi et al. |
| 2006/0065400 A1 | 3/2006 | Smith |
| 2006/0107998 A1 | 5/2006 | Kholy et al. |
| 2006/0289166 A1 | 12/2006 | Stromquist et al. |
| 2007/0014653 A1 | 1/2007 | Glenn et al. |
| 2007/0114035 A1 | 5/2007 | Parris et al. |
| 2007/0179326 A1* | 8/2007 | Baker ............... C10B 47/18 585/241 |
| 2007/0201305 A1 | 8/2007 | Heilman et al. |
| 2008/0008562 A1 | 1/2008 | Beckel et al. |
| 2008/0066911 A1 | 3/2008 | Luharuka et al. |
| 2008/0073895 A1 | 3/2008 | Herman et al. |
| 2008/0179054 A1 | 7/2008 | McGough et al. |
| 2008/0264641 A1 | 10/2008 | Slabaugh et al. |
| 2009/0078410 A1 | 3/2009 | Krenek et al. |
| 2009/0078792 A1 | 3/2009 | Vlasak |
| 2009/0090504 A1 | 4/2009 | Weightman et al. |
| 2010/0038077 A1 | 2/2010 | Heilman et al. |
| 2010/0071284 A1 | 3/2010 | Hagan et al. |
| 2010/0188926 A1 | 7/2010 | Stegemoeller et al. |
| 2010/0243251 A1 | 9/2010 | Luharuka et al. |
| 2010/0243252 A1 | 9/2010 | Luharuka et al. |
| 2010/0243255 A1 | 9/2010 | Luharuka et al. |
| 2010/0278621 A1 | 11/2010 | Redekop |
| 2010/0319921 A1 | 12/2010 | Eia et al. |
| 2010/0329072 A1 | 12/2010 | Hagan et al. |
| 2011/0003720 A1 | 1/2011 | Sullivan |
| 2011/0061855 A1 | 3/2011 | Case et al. |
| 2011/0063942 A1 | 3/2011 | Hagan et al. |
| 2011/0123303 A1* | 5/2011 | Stegemoeller ......... B65D 88/32 414/293 |
| 2011/0127178 A1 | 6/2011 | Claussen |
| 2011/0197536 A1 | 8/2011 | Clark |
| 2011/0255941 A1 | 10/2011 | Friesen |
| 2012/0024738 A1 | 2/2012 | Herman et al. |
| 2012/0048537 A1 | 3/2012 | Rettie et al. |
| 2012/0099954 A1 | 4/2012 | Teichrob et al. |
| 2012/0127820 A1 | 5/2012 | Noles, Jr. |
| 2012/0127822 A1 | 5/2012 | Noles, Jr. |
| 2012/0128449 A1 | 5/2012 | Fikes et al. |
| 2012/0134772 A1 | 5/2012 | Herman et al. |
| 2012/0167485 A1 | 7/2012 | Trevithick et al. |
| 2012/0219391 A1 | 8/2012 | Teichrob et al. |
| 2012/0255734 A1 | 10/2012 | Coli et al. |
| 2012/0273206 A1 | 11/2012 | Zamora et al. |
| 2013/0105166 A1 | 5/2013 | Medvedev et al. |
| 2013/0150268 A1 | 6/2013 | Oldham |
| 2013/0269735 A1 | 10/2013 | Roetzel et al. |
| 2013/0288934 A1 | 10/2013 | Powell et al. |
| 2013/0324444 A1 | 12/2013 | Lesko et al. |
| 2014/0041317 A1 | 2/2014 | Pham et al. |
| 2014/0041319 A1 | 2/2014 | Pham et al. |
| 2014/0041322 A1 | 2/2014 | Pham et al. |
| 2014/0166647 A1 | 6/2014 | Sheesley et al. |
| 2014/0255265 A1 | 9/2014 | Kulkarni et al. |
| 2015/0044003 A1 | 2/2015 | Pham et al. |
| 2015/0044004 A1 | 2/2015 | Pham et al. |
| 2015/0064077 A1 | 3/2015 | McSpadden et al. |
| 2015/0166260 A1 | 6/2015 | Pham et al. |
| 2015/0238912 A1 | 8/2015 | Luharuka et al. |
| 2015/0238913 A1 | 8/2015 | Luharuka et al. |
| 2015/0238914 A1 | 8/2015 | Luharuka et al. |
| 2015/0240148 A1 | 8/2015 | Luharuka et al. |
| 2016/0129418 A1 | 5/2016 | Pham et al. |
| 2016/0130924 A1 | 5/2016 | Pham et al. |
| 2017/0327309 A1 | 11/2017 | Hunter et al. |

FOREIGN PATENT DOCUMENTS

| | | |
|---|---|---|
| CN | 2601189 Y | 1/2004 |
| CN | 2693601 Y | 4/2005 |
| CN | 101434836 A | 5/2009 |
| CN | 201317413 Y | 9/2009 |
| CN | 201458370 U | 5/2010 |
| CN | 201610285 U | 10/2010 |
| CN | 202398329 U | 8/2012 |
| CN | 202506322 U | 10/2012 |
| CN | 203486442 U | 3/2014 |
| CN | 103721619 A | 4/2014 |
| CN | 204109871 U | 1/2015 |
| EP | 0048312 A1 | 3/1982 |
| EP | 0241056 A1 | 2/1987 |
| EP | 0241056 A1 | 10/1987 |
| EP | 2449205 A2 | 5/2012 |
| EP | 2609999 A1 | 7/2013 |
| FR | 2655007 A1 | 5/1991 |
| JP | S5715828 A | 1/1982 |
| KR | 10-0589613 B1 | 6/2006 |
| NO | 2007022300 A3 | 7/2007 |
| RU | 10418 U1 | 7/1999 |
| RU | 2228842 C2 | 1/2004 |
| SU | 1341161 A1 | 9/1987 |
| WO | 8500046 A1 | 1/1985 |
| WO | 1985000046 | 1/1985 |
| WO | 0244517 A1 | 6/2002 |
| WO | 03087182 A2 | 10/2003 |
| WO | 2007098606 A1 | 9/2007 |
| WO | 2010070599 A1 | 6/2010 |
| WO | 2011061503 A1 | 5/2011 |
| WO | WO2011088493 | 7/2011 |
| WO | 2012121896 A2 | 9/2012 |
| WO | 2012166590 A1 | 12/2012 |
| WO | 2013099826 A1 | 7/2013 |
| WO | 2013134624 A1 | 9/2013 |
| WO | 2014028317 A1 | 2/2014 |

OTHER PUBLICATIONS

Office Action issued in U.S. Appl. No. 13/839,368 dated Sep. 27, 2016; 17 pages.

Office Action issued in Chinese Patent Application No. 201380048297.2 dated Sep. 23, 2016; 17 pages (with English translation).

Notice of Allowance issued in U.S. Appl. No. 13/838,872 dated Dec. 2, 2016; 6 pages.

Examination Report issued in Australian Patent Application No. 2013302969 dated Dec. 8, 2016; 5 pages.

Office Action issued in U.S. Appl. No. 13/839,368 dated Apr. 14, 2017; 19 pages.

Decision on Grant issued in Russian Patent Appl. No. 2017102359 dated Jul. 27, 2018; 15 pages (with English translation).

Office Action issued in Chinese Patent Appl. No. 201580034894.9 dated Jul. 3, 2018; 9 pages (with English translation).

Decision on Grant issued in Russian Patent Appl. No. 2014132435 dated Sep. 20, 2018; 23 pages (with English translation).

(56) References Cited

OTHER PUBLICATIONS

Office Action issued in Russian Patent Appl. No. 2015117770 dated Nov. 16, 2018; 16 pages (with English Translation).
Office Action issued in Russian Patent Appl. No. 2015117758 dated Dec. 5, 2018; 13 pages (with English translation).
Office Action issued in Chinese Patent Appl. No. 201580036796.9 dated Oct. 25, 2018; 29 pages (with English translation).
Office Action issued in Chinese Patent Appl. No. 2015800109793 dated Sep. 12, 2018; 32 pages (with English translation).
Office Action issued in Chinese Patent Appl. No. 201580032114.7 dated Jul. 18, 2018; 15 pages.
Office Action issued in Eurasian Patent Appl. No. 201691737/31 dated Mar. 19, 2018; 4 pages (with English translation).
International Search Report and Written Opinion issued in PCT/US2015/030287 dated Jul. 29, 2015; 14 pages.
Extended Search Report issued in European Patent Appl. No. 15755550.9 dated Oct. 9, 2017; 8 pages.
International Search Report and Written Opinion issued in PCT/US2015/017175 dated May 28, 2015, 16 pages.
International Search Report and Written Opinion issued in PCT/US2015/059177 dated Feb. 17, 2016; 14 pages.
International Search Report and Written Opinion issued in PCT/US2015/059182 dated Feb. 29, 2016; 13 pages.
Examination Report dated Dec. 19, 2018 in corresponding AU Application No. 2015259393; 4 pages.
"Practical Technical Manuel for Dairy Product Engineer", Gu Ming editor, China Light Industry Press, Jan. 2009, pp. 605-607.

\* cited by examiner

SYSTEM AND METHOD FOR DELIVERY OF OILFIELD MATERIALS

INCORPORATION BY REFERENCE

The provisional patent applications identified by U.S. Ser. No. 61/682,734, filed on Aug. 13, 2012, U.S. Ser. No. 61/746,154, filed on Dec. 27, 2012, and U.S. Ser. No. 61/746,158, filed on Dec. 27, 2012 are hereby incorporated herein by reference in their entirety.

BACKGROUND

To facilitate the recovery of hydrocarbons from oil and gas wells, the subterranean formations surrounding such wells can be hydraulically fractured. Hydraulic fracturing may be used to create cracks in subsurface formations to allow oil and/or gas to move toward the well. The formation is fractured by introducing a specially engineered fluid, sometimes referred to as fracturing fluid or fracturing slurry, at high pressure and high flow rates into the formation through one or more wellbores. The fracturing fluids may be loaded with proppants which are sized particles that may be mixed with the liquids of the fracturing fluid to help form an efficient conduit for production of hydrocarbons from the formation to the wellbore. Proppant may comprise naturally occurring sand grains or gravel, man-made proppants, e.g. fibers or resin coated sand, high-strength ceramic materials, e.g. sintered bauxite, or other suitable materials. The proppant collects heterogeneously or homogeneously inside the fractures to prop open the fractures formed in the formation. Effectively, the proppant creates planes of permeable conduits through which production fluids can flow to the wellbore.

At the wellsite, proppant and other fracturing fluid components are blended at a low-pressure side of the system. Water-based liquid is added and the resulting fracturing fluid is delivered downhole under high pressure. However, handling of the proppant prior to blending tends to create substantial dust as the proppant is moved to wellsite storage and then to the blender via blowers and mechanical conveyors, respectively. As a result, dust control devices, e.g. vacuums, are employed in an effort to control the dust. The variety of equipment used in the process also tends to create a large footprint and reduced process reliability at the wellsite, and operating the equipment is generally a manually intensive process. Moreover, pneumatic transfer of proppant from haulers to storage is limited by low transfer rates, which lead to high demurrage costs and further increase in the footprint at the wellsite due to the need of multiple haulers to meet the job demand.

SUMMARY

In general, the present disclosure aims to provide a system and method which facilitate the handling of oilfield materials in a substantially automated and space efficient manner. The present disclosure provides a plurality of modular silos, each modular silo being a modular unit sized for over-the-road transport by a trailer, and each modular silo having an enclosed interior for holding oilfield material. The modular silos have outer housings surrounding an enclosed interior for holding the oilfield material, and feeders which are oriented to deliver the oilfield material to a common area for blending. In one embodiment, the common area is located below and overlaps with the outer housings.

The present disclosure also aims to provide a system and method of handling oilfield materials in a manner that minimizes dust migration. The oilfield materials are delivered without blowers to at least one of the modular silos. A vertical conveyor, such as a bucket elevator, is positioned within the enclosed interior of the modular silo and is used to lift the oilfield material from a silo inlet to an upper portion of the modular silo without utilizing airflow to carry the oilfield materials. To increase storage capacity of the modular silos, the vertical conveyor extends from a top of the modular silo and is horizontally offset to avoid a gooseneck of a trailer which can be used to deliver the modular silo to the wellsite.

The present disclosure also aims to provide a system and method of handling oilfield materials in a time and cost efficient manner, while minimizing human intervention. For example, once the oilfield materials are disposed within the upright modular silo, the outflow of oilfield materials through a silo outlet may be controlled so as to selectively release the desired amount of material, by gravitational flow, directly into a blender or other suitable oilfield service equipment positioned underneath the modular silo.

The present disclosure also aims to reduce the time that it takes to unload a truck delivering oilfield material to the wellsite. This can be accomplished by a conveyor having a horizontal portion designed to be backed over by the trailer and positioned underneath multiple outlets on the underside of the trailer. Once the horizontal portion of the conveyor is positioned below the multiple outlets on the underside of the trailer, then oilfield material can be simultaneously delivered through the outlets of the trailer onto the horizontal portion of the conveyor and transferred by the conveyor into the silo inlet of one or more of the modular silos. A diverter having a single inlet and multiple outlets can be positioned between the conveyor and at least two of the silo inlets to utilize a single transfer conveyor to feed either of the two silos while maintaining a standard (fixed) setup.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
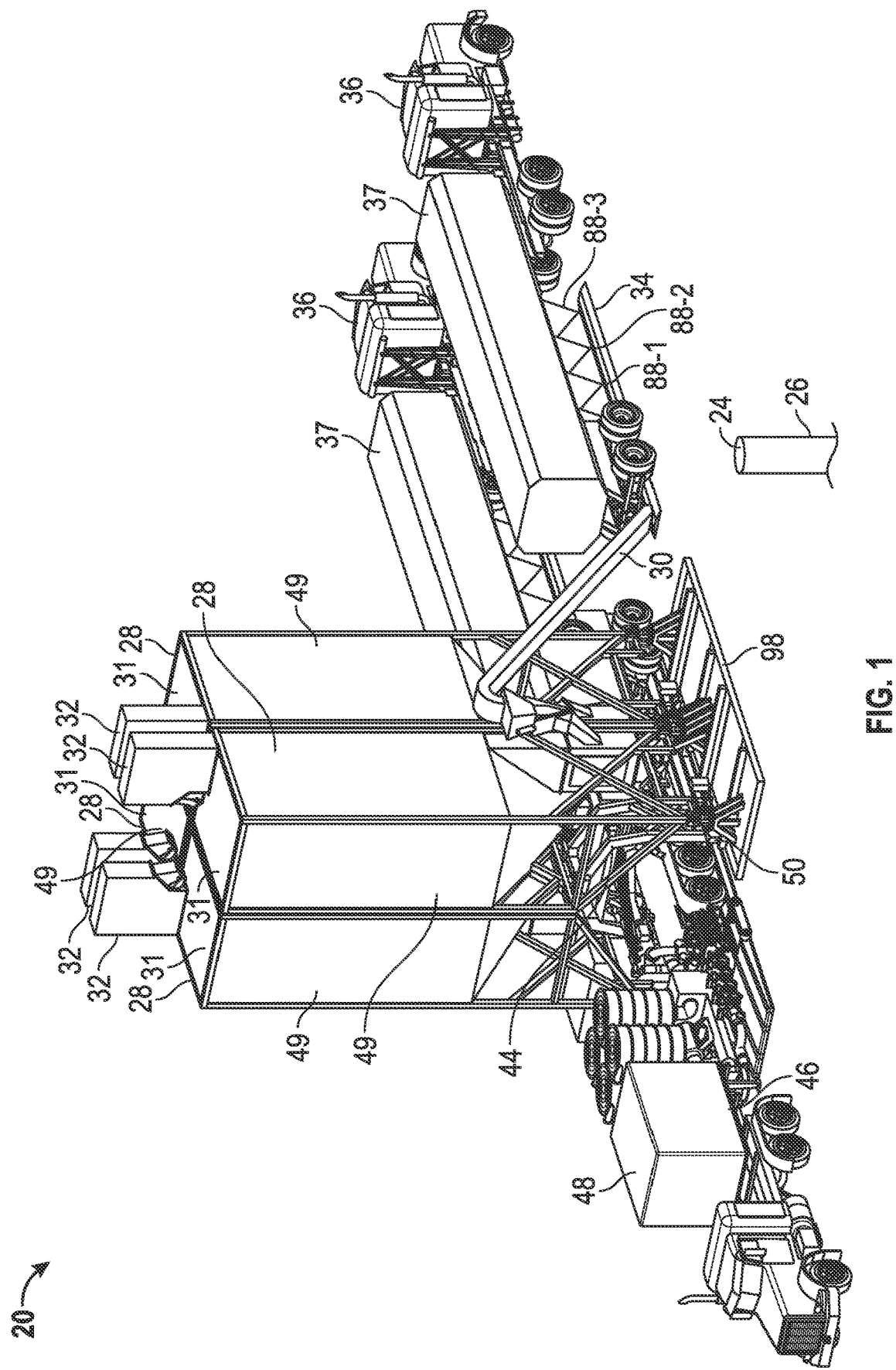
FIG. 1 depicts an illustration of an example of a proppant delivery system positioned at a wellsite, according to an embodiment of the disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Finally, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

The present disclosure generally involves a system and methodology to facilitate handling of oilfield materials in a space efficient manner. In one embodiment, the oilfield materials may be carried to a wellsite by suitable trucks and loaded into at least one modular silo without using air to carry the oilfield material. By way of example, the oilfield materials may be moved into a plurality of modular silos by using vertical conveyors to move the oilfield material without blowers. In some embodiments, each modular silo comprises an outer housing defining an enclosed interior for receiving the oilfield material. A corresponding vertical conveyor is positioned within the enclosed interior and is used to lift the oilfield material from a silo inlet, e.g. a hopper, to an upper portion of the modular silo without utilizing airflow to carry the oilfield materials. Once the oilfield material is disposed within the upright modular silo, the outflow of oilfield material through a silo outlet may be gravity controlled so as to selectively release the desired amount of material into a blending system or other suitable equipment positioned underneath the modular silo.

According to a specific example, a vertical silo is designed as a modular silo which may be carried by an over-the-road truck. Truck refers to a transport vehicle, such as an articulated truck having a trailer pulled by a tractor. In this example, the modular silo is carried by the trailer of the truck. However, the truck also may comprise a straight truck or other suitable truck designed to carry the modular silo and to transport the modular silo over public roadways. In this example, the modular silo is erected from the truck to a vertical position at a wellsite to provide an efficient solution for proppant delivery that avoids bottlenecks associated with existing systems. However, it should be understood that in other embodiments, a crane may be used to lift the modular silo and place the modular silo onto a support structure.

Figure 5:
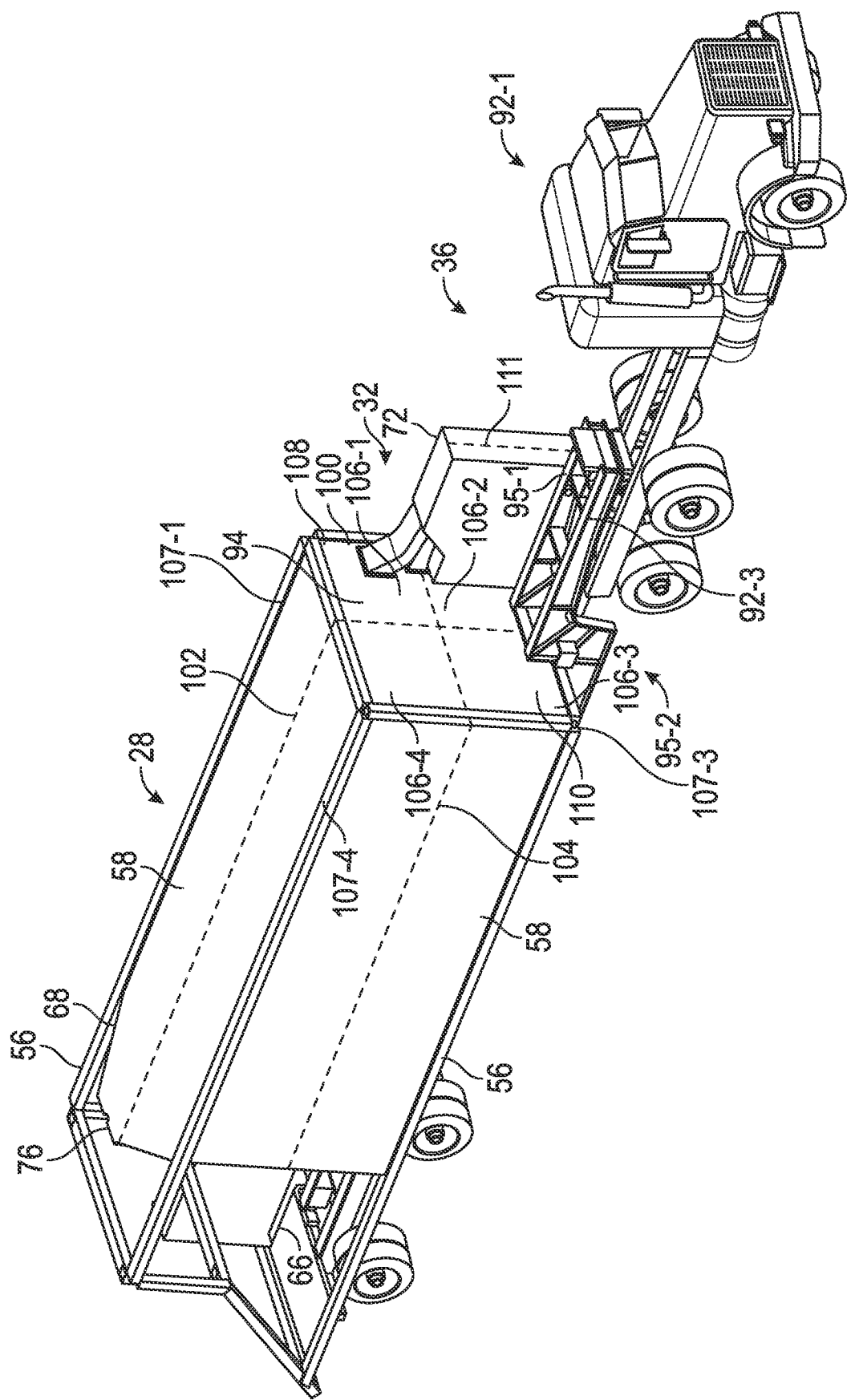
FIG. 5 depicts an illustration of a modular silo being transported by an over-the-road truck, according to an embodiment of the disclosure.

In this embodiment, a conveyor, such as a mechanical belt conveyor, may be utilized to move oilfield material unloaded from a gravity dump transport into an intake hopper of a vertical conveyor enclosed within the modular silo. The mechanical belt conveyor can be backed-over by a trailer hauling the oilfield material with multiple nozzles overlapping the mechanical belt conveyor, or other types of haulers may also be used, such as tail dumps and live bottom trailers. By way of example, the vertical conveyor may comprise a bucket elevator or other type of vertical conveyor capable of conveying the oilfield material to an upper end of the modular silo a substantial distance, e.g. 30 (9.144 meters) to 70 (21.336 meters) feet, above the wellsite surface. The conveyor moving the oilfield material to the modular silo and the vertical conveyor may be enclosed to provide a dust free solution for handling oilfield material at much higher rates with greater energy efficiency and lower attrition than that achieved with existing pneumatic, e.g. blower, type conveyance systems. To increase storage capacity of the modular silo as compared to a cylindrical silo, the outer housing may have a substantially rectangular shape defining four corners (which may form pointed vertices or be rounded. The modular silo may be transported on a trailer having a gooseneck. As best shown in FIG. 5, to further increase the storage capacity of the modular silo while still being capable of being transported by a truck, the vertical conveyor may extend beyond a top of the outer housing and be offset towards one of the corners so as to avoid the gooseneck of the trailer.

Depending on the parameters of a given fracturing process, a plurality of the modular silos may be grouped together so that feeders of the plurality of modular silos provide oilfield material to a common area, e.g. to a truck mounted blending system having a proppant metering/rate control system, or other portable blender or blending system positioned beneath the modular silos. In order to reduce the space required at the wellsite for the plurality of the modular silos, the common area may be located below and overlaps the outer housings of the modular silos. Additionally, some or all of the modular silos may be divided into compartments. In some applications, individual modular silos may have a plurality of internal compartments for holding different types of oilfield materials. Individual silos also may be divided into main storage compartments and secondary storage compartments located below the main storage compartments. In the latter example, the main storage compartment may be used to gravity feed oilfield material to an outlet feeder for distribution into the blender. Some systems may utilize a belt feeder or other type of feeder system instead of gravity feed. The secondary storage compartment may be exposed to the internal vertical conveyor and proppant from the secondary storage compartment may continually be lifted and discharged into the main storage compartment. In some applications, the secondary compartments or other compartments of the modular silo may have separate features which enable independent filling of those particular compartments. Additionally, outlet feeders may be designed with controllable mechanisms, e.g. gates, which are adjustable to control the outflow of oilfield material.

The modular silos may be designed in a variety of sizes and shapes, including cylindrical shapes or rectangular shapes, selected to enable transport via a suitable over-the-road truck. By way of example, the modular silos may vary in size according to the proppant delivery plan for a given fracturing operation, but an example of a suitable modular silo may hold 2000-4000 (609.6-1219.2 meters) cubic feet of oilfield material. In some systems, the modular silos are provided with sufficient clearance on the bottom side to form an unobstructed passage to enable a portable blender, such as a truck mounted blender, to be driven under a system of combined modular silos to receive oilfield material via gravity feed. For example, the portable blender may be mounted on a truck trailer which is backed into position under the outlet feeders of a plurality of modular silos. In some embodiments, the modular silos may be designed as standalone silos and in other embodiments, the modular silos may be designed for placement on a framework/support structure which supports the modular silos at a desired height. In one embodiment the blending system may be skid mounted in order to be transported on a trailer to the wellsite and then placed under the silo system by a suitable mechanical device, such as a winch.

Each of these embodiments may utilize an enclosed, vertical conveyor to avoid blowing of the oilfield material, although in other embodiments a pneumatic fill tube can be used as a vertical conveyor. Each modular silo also may be filled by an integrated, oilfield material loading and delivery system utilizing an enclosed conveyor or other suitable system for moving oilfield material from an unload area to an inlet associated with the vertical conveyor at a lower portion of the modular silo. In some applications, the vertical conveyor may be powered by a belt or other device driven by the enclosed conveyor system used to move oilfield material from the unload area to the inlet of the modular silo. This allows the system to be substantially automated. However, the individual motive systems, e.g., vertical conveyor and enclosed conveyor extending from the unload area, may be powered individually or collectively by a variety of sources, including various motors, engines, or other devices.

Referring generally to FIG. 1, an embodiment of a system, e.g. a system for fracturing formations, is illustrated in position at a wellsite. By way of example, the fracturing system may comprise many types of equipment, including vehicles, storage containers, material handling equipment, pumps, control systems, and other equipment designed to facilitate the fracturing process.

In the example of FIG. 1, a formation fracturing system 20 is illustrated in position at a wellsite 22 having a well 24 with at least one wellbore 26 extending down into a reservoir/formation. The formation fracturing system 20 may comprise many types and arrangements of equipment, and the types or arrangements may vary from one fracturing operation to another. By way of example, the formation fracturing system 20 may comprise at least one modular silo 28, e.g. a plurality of modular silos that may be transported over-the-road by trucks able to operate on public roadways. The modular silos 28 are designed to store oilfield material such as a proppant used to prop open fractures upon fracturing of the subterranean formation, or guar used to increase the viscosity of a hydraulic fracturing fluid. In the example illustrated, several modular silos 28 receive oilfield material via conveyors 30, e.g. belt conveyors, and the oilfield material is lifted to an upper portion 31 of each modular silo by corresponding vertical conveyors 32. The conveyors 30 and the vertical conveyors 32 may operate by carrying the oilfield material instead of blowing the oilfield material to avoid erosion of components and dusting of the area. Additionally, the conveyors 30 and vertical conveyors 32 may be enclosed to further reduce dust as the oilfield material is delivered from an unload area 34 and into the modular silos 28.

As illustrated, oilfield material transport trucks 36 may be used to deliver oilfield material to the unload area 34. In this example, the trucks 36 are tractor-trailer trucks having trailers 37 which may be backed over a portion of a selected conveyor 30. The trailers 37 can be gravity feed trailers or other types trailers capable of moving the oilfield material to the wellsite 22. The trailers may be operated to release the oilfield material onto a belt or other suitable carrier of the selected conveyor 30 for transfer to the associated modular silo or silos 28 along an enclosed pathway within the conveyor 30.

In this example, the formation fracturing system 20 may comprise a variety of other components including water tanks (not shown) for supplying water that is mixed with the oilfield material to form the hydraulic fracturing fluid, e.g. proppant slurry, that may be pumped downhole into wellbore 26 via a plurality of pumps (not shown). By way of example, pumps may be truck mounted pumps, e.g. pumping systems mounted on truck trailers designed for over-the-road transport. The multiple pumps may be coupled to a common manifold (not shown) designed to deliver the hydraulic fracturing fluid to the wellbore 26. The formation fracturing system 20 also may comprise a blending system 44 designed to blend oilfield material delivered from modular silos 28. By way of example, the blender 44 may be a portable blender, such as a truck mounted blender or a skid mounted blender. In the specific example illustrated, blending system 44 is mounted on a truck trailer 46 that may be driven, e.g. backed up, into a common area 47 (shown in FIG. 8) that is positioned underneath or proximate to the modular silos 28. The formation fracturing system 20 also may comprise a variety of other components, such as a control facility 48 and/or other components designed to facilitate a given fracturing operation. In one embodiment, the common area 47 is located below and overlaps with outer housings 49 of the modular silos 28.

Figure 2:
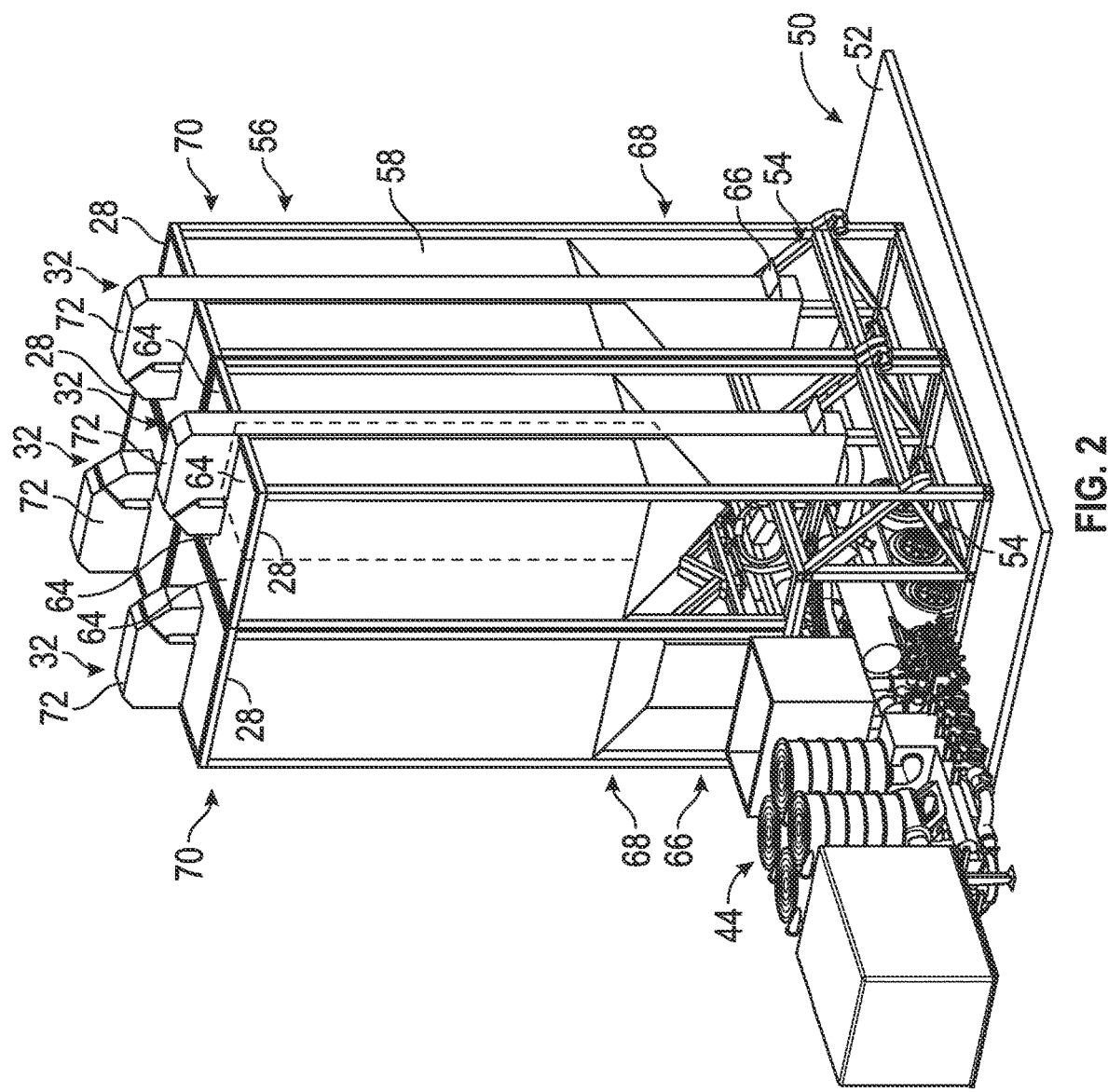
FIG. 2 depicts an illustration of another embodiment of a proppant delivery system in which a plurality of closed, modular silos are used for holding oilfield materials, according to an embodiment of the disclosure.

Referring generally to FIG. 2, an embodiment of modular silos 28 coupled together into a cooperating unit is illustrated. In this example, a plurality of the modular silos 28, e.g. four modular silos 28, is coupled together on a modular support structure, or framework, 50 which may be mounted on a pad 52. For example, the modular silos 28 may be releasably mounted in a generally upright or vertical orientation on support structure 50. Support structure 50 is constructed with a plurality of silo receiving regions 54 on which the individual modular silos 28 may be mounted in a generally upright or vertical orientation. The support structure 50 and the silo receiving regions 54 may be designed to elevate the modular silos 28 to a sufficient height so as to allow movement of portable blending system 44 to a position sufficiently beneath the modular silos 28 within the common area 47 in order to receive a controlled outflow of oilfield material. For example, the support structure 50 may be designed to allow a truck mounted blending system 44 to be driven, e.g. backed up, into position beneath the modular silos 28, as illustrated. Additionally, pad 52 may be constructed in a variety of sizes and forms, including cement pads, compacted aggregate pads, pads constructed as portable structures, mixtures of these various structural elements, and/or other suitable pad types for supporting the plurality of modular silos 28.

Figure 3:
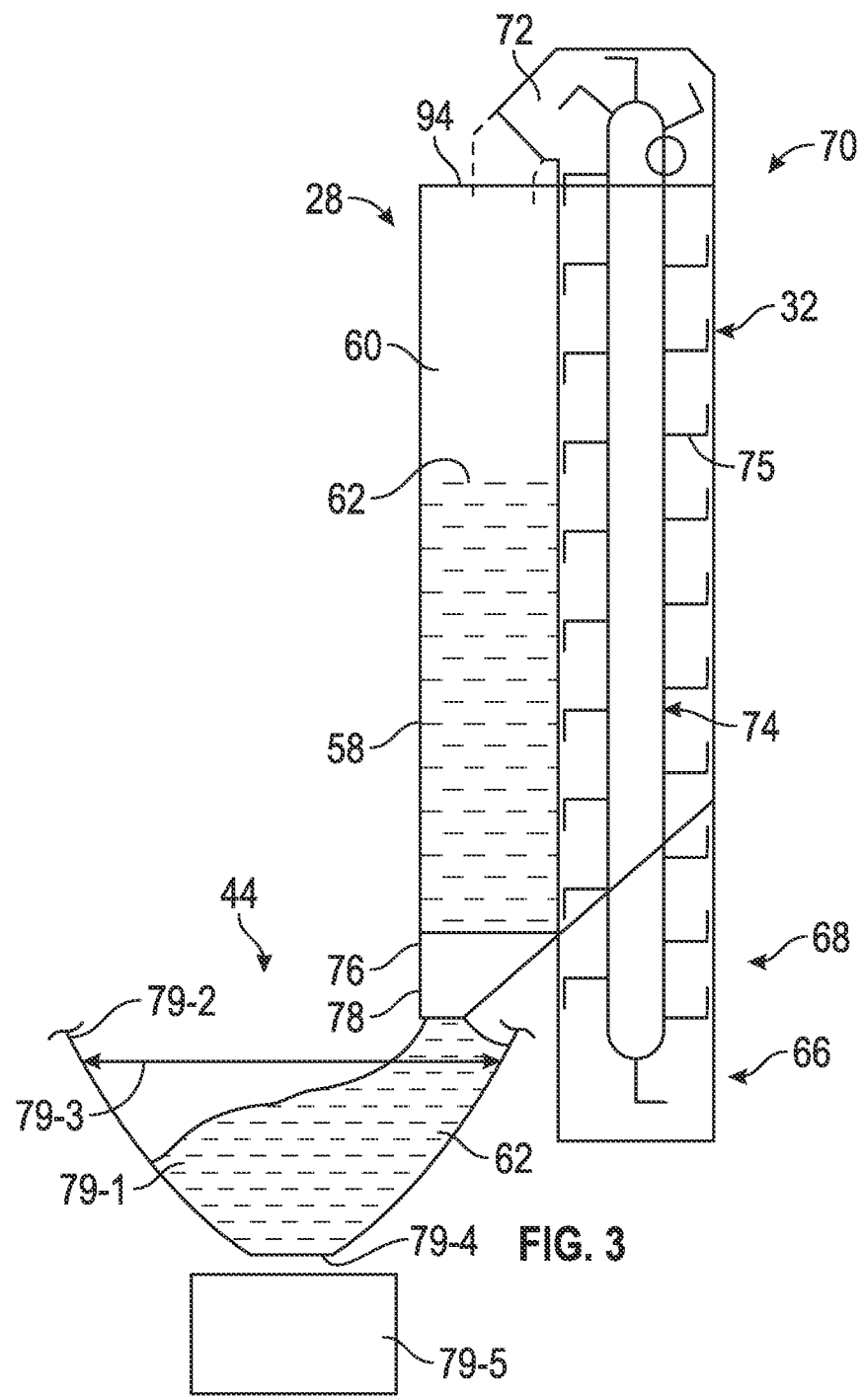
FIG. 3 depicts a schematic illustration of an example of a vertical conveyor system enclosed within a modular silo, according to an embodiment of the disclosure.

In the example illustrated, modular silos 28 each may be constructed with a silo frame 56 supporting the outer housing 49 which defines an enclosed interior 60 for holding oilfield material 62 (see also FIG. 3). Depending on the fracturing operation, oilfield material 62 may comprise naturally occurring sand grains or gravel, man-made proppants, resin coated sand, high-strength ceramic materials, e.g. sintered bauxite, other solids such as fibers, mica, mixtures of different sized oilfield materials, mixtures of different types of oilfield materials, and/or other suitable oilfield materials. In some applications, selected modular silos 28 or each of the modular silos 28 may be divided into the compartments 64 designed to hold different types of oilfield materials 62 that may be selectively released from the modular silo 28 and blended via the blending system 44. Each enclosed vertical conveyor 32 is designed to lift oilfield material (e.g., with or without blowing) from an inlet 66, e.g. an inlet hopper, disposed at a lower portion 68 to an upper discharge portion 70 for release into enclosed interior 60 through a vertical conveyor head 72. In some embodiments, the conveyor head 72 may have a pivotable or otherwise movable discharge which is selectively controllable to deliver the desired oilfield material to a corresponding desired compartment 64 within a given modular silo 28.

With further reference to FIG. 3, the vertical conveyor 32 may be positioned within enclosed interior 60 in a manner which limits escape of dust while providing a uniform modular unit that may be readily transported via an over-the-road truck, such as truck 36 with a suitably designed trailer. Vertical conveyor 32 also may be constructed in a variety of forms. For example, the vertical conveyor 32 may be constructed as a bucket elevator 74 having a plurality of buckets 75 conveyed in a continuous loop lifting oilfield material 62 from inlet 66 to upper discharge portion 70 for discharge into enclosed interior 60 via vertical conveyor head 72. The outflow of oilfield material 62 to the blending system 44 may be through an outlet, e.g. a feeder 76, and the amount of outflow through feeder 76 may be controlled by a suitable outflow control mechanism 78. For example, the blending system 44 may include a hopper 79-1 having an inlet 79-2 positioned below the feeder 76. In one embodiment, the outer housing 58 overlaps the inlet 79-2 of the hopper 79-1. The inlet 79-2 of the hopper 79-1 may have a width 79-3 up to 12 (3.6576 meters) feet, and desirably between 8 (2.4384 meters) feet to 8.5 (2.5908 meters) feet. The hopper 79-1 may also have an outflow control mechanism 79-4 which is similar to the outflow control mechanism 78. By way of example, outflow control mechanisms 78 and 79-4 may comprise a controllable gate, e.g. hydraulic gate, control valve, or other flow control mechanism which is operated via control facility 48 or via another suitable control system. In this example, oilfield material 62 is gravity fed through feeder 76 and the amount of outflow is governed by the outflow control mechanism 78. In one embodiment, the oilfield material 62 into a blender 79-5 of the blending system 44 may be regulated by both of the outflow control mechanisms 78 and 79-4. In this instance, the outflow control mechanism 79-4 may be maintained in a fixed open position while the outflow control mechanism 78 is regulated in real-time by the control facility 48 to control an amount of oilfield material 62 discharged into the blender 79-5. Because the feeder 76 is within the confines of the hopper 79-1, as the hopper 79-1 fills with oilfield material 62, the oilfield material 62 will bear against the feeder 76 and form a plug. In this manner, the outflow control mechanism 79-4 is self-regulating and the outflow control mechanism 78 and the control facility 48 may solely control the amount of oilfield material 62 discharged into the blender 79.

Figure 4:
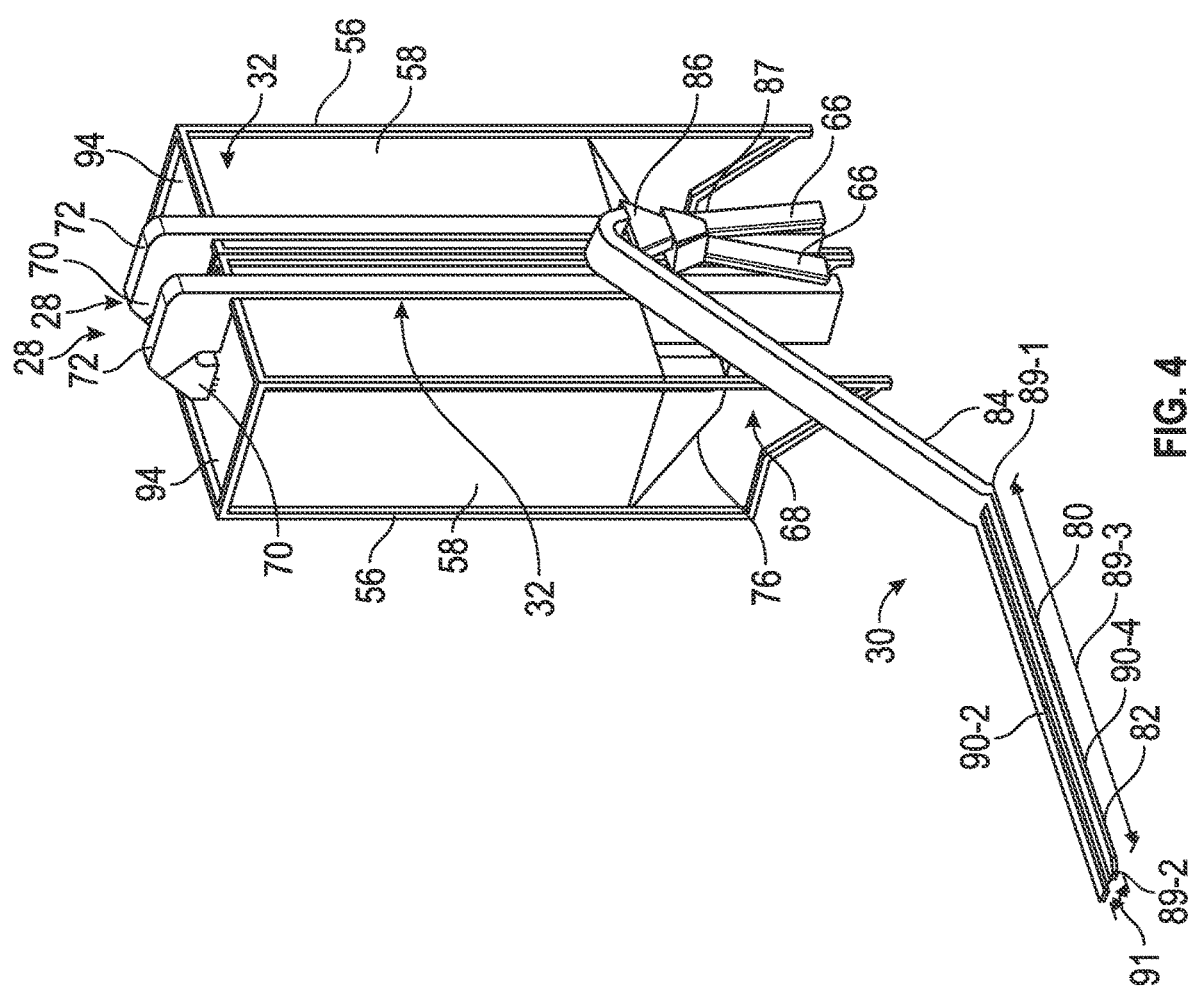
FIG. 4 depicts an illustration of an example of an enclosed conveyor system for delivering oilfield materials from an unload area to inlets of modular silos for delivery to an upper portion of the modular silos via vertical conveyor systems, according to an embodiment of the disclosure.

In some applications, the external conveyor or conveyors 30 have a horizontal portion 80 with an exposed belt 82, as illustrated in FIG. 4 that the trailers 37 of the trucks 36 can be backed over. The oilfield material may be unloaded via gravity from one of the trailers 37 which is backed over the horizontal portion 80. The oilfield material dropped onto belt 82 is conveyed onto an inclined portion 84 of conveyor 30 which may be enclosed and transports the oilfield material along an incline for release into at least one inlet 66 of a corresponding modular silo 28. In the specific example illustrated, the inclined portion 84 delivers the oilfield material into a hopper 86 of a diverter 87. Diverter 87 splits and diverts the oilfield material into downward flows which enter a plurality of inlets 66 of a plurality of modular silos 28. For example, the diverter 87 may be designed to deliver proppant from conveyor 30 into a pair of inlets 66 associated with adjacent modular silos 28. As described above, the oilfield material is then lifted by the vertical conveyor 32 of each modular silo 28. In this example, the oilfield material unloaded from truck 36 is immediately moved into an enclosed system and is automatically conveyed into the enclosed interiors 60 of adjacent modular silos 28 without releasing dust into the surrounding environment.

The horizontal portion 80 is designed to enhance the rate at which oilfield material can be transferred into the modular silos 28 from the trailer 37. In particular, as shown in FIG. 1, the trailer 37 may be provided with multiple outlets 88-1, 88-2 and 88-3 which are spaced apart on the underside of the trailer 37. Although three outlets 88-1, 88-2, and 88-3 are shown and described, more or less outlets can be provided on the underside of the trailer 37. The horizontal portion 80 is provided with a first end 89-1, a second end 89-2 and a length 89-3 extending between the first end 89-1 and the second end 89-2. The first end 89-1 overlaps the inclined portion 84 so as to transfer the oilfield material onto the inclined portion 84 from the trailer 37 of the truck 36. The horizontal portion 80 may have a height above the ground sufficient to permit the trailer 37 to be backed over the horizontal portion 80 and positioned underneath the outlets 88-1, 88-2, and 88-3 and between the wheels of the trailer 37. For example, the horizontal portion may have a height of less than 12 inches, and desirably between 6-8 inches. The length 89-3 of the horizontal portion 80 may be sufficient to be positioned in the unload area and simultaneously under all of the multiple outlets 88-1, 88-2 and 88-3. For example, the length 89-3 may be in a range from 8 (2.4384 meters) feet to 51 (15.5448 meters) feet. Once the trailer 37 is backed over the horizontal portion 80, the oilfield material may be simultaneously delivered through the outlets 88-1, 88-2 and 88-3 of the trailer 37 and onto the exposed belt 82 of the horizontal portion 80. The horizontal portion 80 also has a first side 90-1, a second side 90-2 extending substantially parallel to the first side 90-1, and a width 91 extending between the first side 90-1 and the second side 90-2. The width 91 is designed to fit in a space between the wheels of the trailer 37 so that the trailer 37 can be backed over the horizontal portion 80. For example, the width 91 can be approximately two (0.6096 meters) feet.

As discussed above, each modular silo 28 may be designed as a modular unit used alone or in cooperation with other silos 28. The modularity along with the design and sizing of the modular silos 28 enables transport of individual modular silos 28 over public highways via trucks 36. As illustrated in FIG. 5, a suitable truck 36 may comprise a tractor 92-1 pulling a gooseneck trailer 92-2 appropriately sized to receive one of the modular silos 28 in a lateral, e.g. horizontal, orientation. The gooseneck trailer 92-2 has a gooseneck 92-3 connecting the gooseneck trailer 92-2 to the tractor 92-1. In the example illustrated, the modular silo 28 is constructed such that the vertical conveyor head 72 of the vertical conveyor 32 is disposed along a side of the modular silo 28 and extends from a closed top 94 of the outer housing 58 of the modular silo 28 along a side 95-1 of the gooseneck 92-3. In this position, the vertical conveyor head 72 overlaps with the side 95 of the gooseneck 92-3, and may avoid overlapping with a top 95-2 of the gooseneck 92-3. The vertical conveyor 32 may extend between one inch and ten (3.048 meters) feet beyond the closed top 94 of the outer housing 58 in order to enable transport of the modular silo 28 on the gooseneck trailer 92-2, as illustrated. The gooseneck trailer 92-2 can be a conventionally styled gooseneck trailer, for example.

In the example illustrated in FIG. 5, the modular silo 28 includes silo frame 56 which is designed for engagement with support structure 50 at one of the silo receiving regions 54. However, silos 28 may be constructed in other types of configurations. For example, each modular silo 28 may be constructed as a standalone silo. In this configuration, silo frame 56 may be designed to engage a silo support pad located at the base of the modular silo 28. A variety of outriggers may be used in cooperation with silo support pad and/or silo frame 56 to stabilize the modular silo 28 when pivoted into its upright position. By way of example, the outriggers may be hydraulically, electrically, pneumatically, manually, or otherwise actuatable between a retracted position and an extended position to support the modular silo 28 in the vertical position. In some embodiments, outriggers 98 may be mounted to the support structure 50 to stabilize the support structure 50 when the modular silos 28 are mounted in an upright position on the support structure 50, as shown in FIG. 1.

Figure 6:
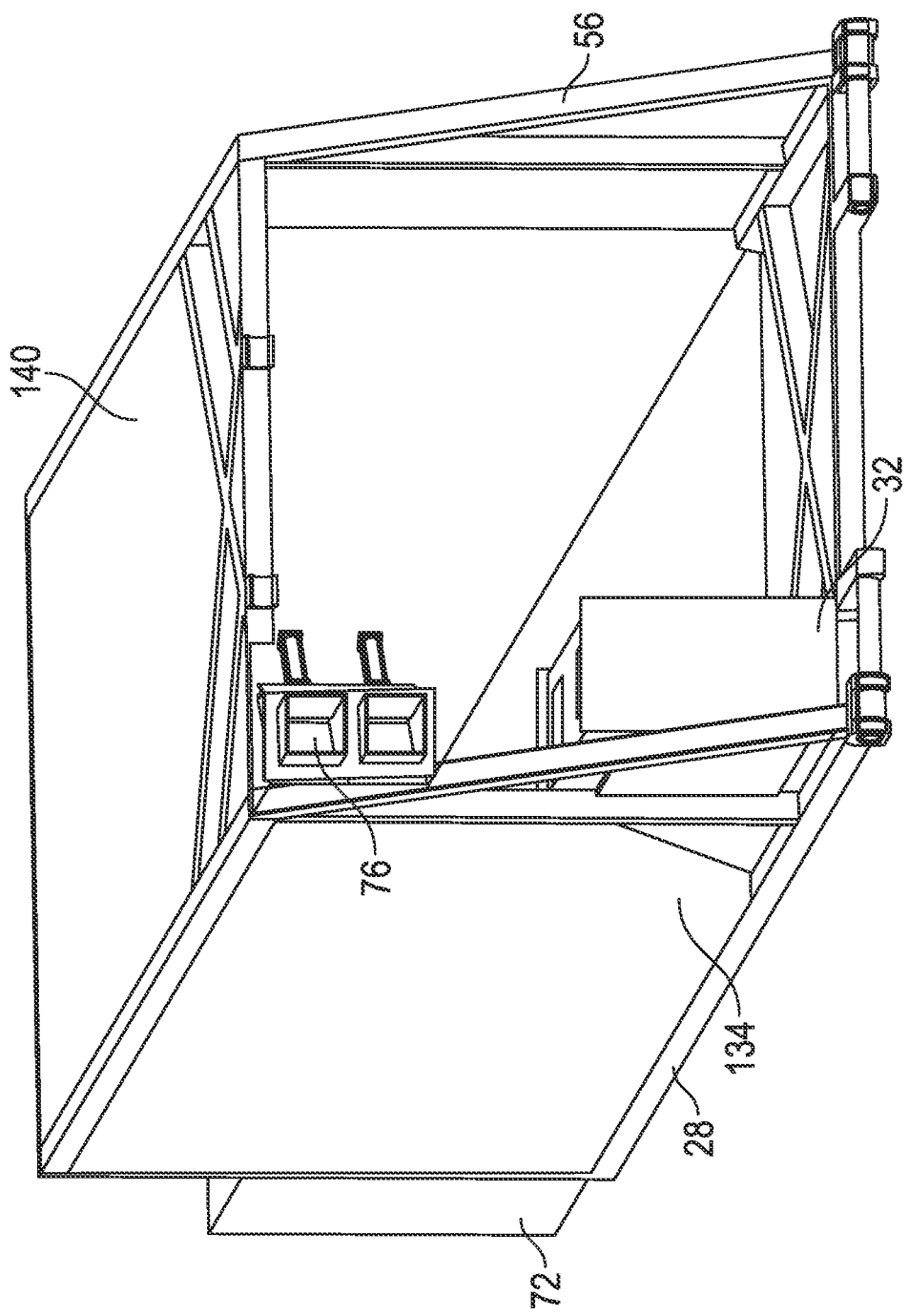
FIG. 6 is a bottom perspective view of one of the modular silos, according to an embodiment of the disclosure.

Referring to FIGS. 5 and 6, in one embodiment, the modular silos 28 have been constructed in a manner which goes against conventional wisdom. In particular, conventional wisdom would center the vertical conveyor 32 on a centerline of the modular silo in order to balance the modular silos 28 on the trailers 37. However, as shown in FIGS. 5 and 6, the vertical conveyor 32 and the feeder 76 of the modular silos 28 may be arranged on a same side of the outer housing 58 so as to facilitate the formation of the modular silos 28 into the cooperating unit shown and described above with respect to FIGS. 1 and 2, although the modular silos 28 may not be balanced on the trailers 37. In particular, as shown in FIG. 5, the outer housing 58 has a lower portion 68 and an upper portion 100. The outer housing 58 also has a first centerline 102 and second centerline 104 extending from the lower portion 68 to the upper portion 100 of the outer housing 58 and dividing the enclosed interior 60 generally into quadrants 106-1, 106-2, 106-3 and 106-4. In the example shown, the outer housing 58 has a substantially rectangular shape defining four corners 107-1, 107-2, 107-3 and 107-4 and each quadrant 106-1, 106-2, 106-3 and 106-4 encompasses one of the corners 107-1, 107-2, 107-3 and 107-4. The first centerline 102 also divides the outer housing 58 into a first half 108 and a second half 110 with the first quadrant 106-1 encompassed within the first half 108. The vertical conveyor 32 is mounted to the outer housing 58 and extends from the lower portion 68 to the upper portion 100 and may be within 5 degrees of parallel to the first centerline 102. The vertical conveyor 32 may be located within the second quadrant 106-2 of the quadrants 106-1, 106-2, 106-3 and 106-4 and positioned adjacent to the first quadrant 106-1, the corner 107-4 and within the first half 108.

In this example, the vertical conveyor 32 has third centerline 111 which is offset from the first centerline 102 such that the third centerline 111 is horizontally offset from and clears the side 95-1 of the gooseneck trailer 92-3. For example, the third centerline 111 can be offset between two (0.6096 meters) feet and seven (2.1336 meters) feet from the first centerline 102.

It should be noted that the corners 107-1, 107-2, 107-3 and 107-4 can either be shaped as a vertex, or rounded in order to provide a stronger outer housing 58. In addition, the sides of the outer housing 58 may be planar or concavely shaped in order to bulge outwardly in a predetermined manner when the oilfield material 62 is loaded into the enclosed interior 60 of the modular silo 28.

Figure 7:
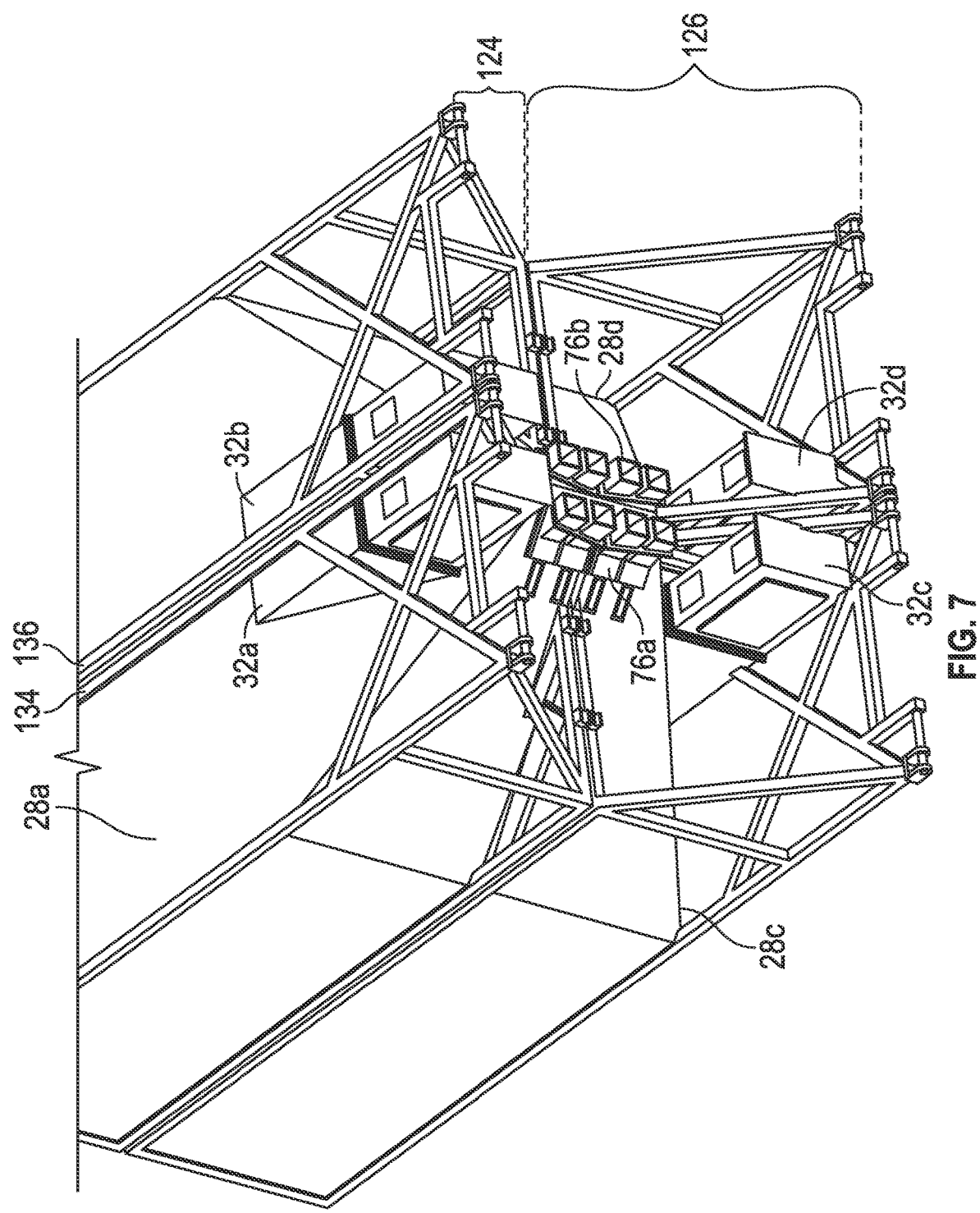
FIG. 7 is a partial bottom perspective view of four modular silos arranged in a group and connected together, according to an embodiment of the disclosure.
Figure 8:
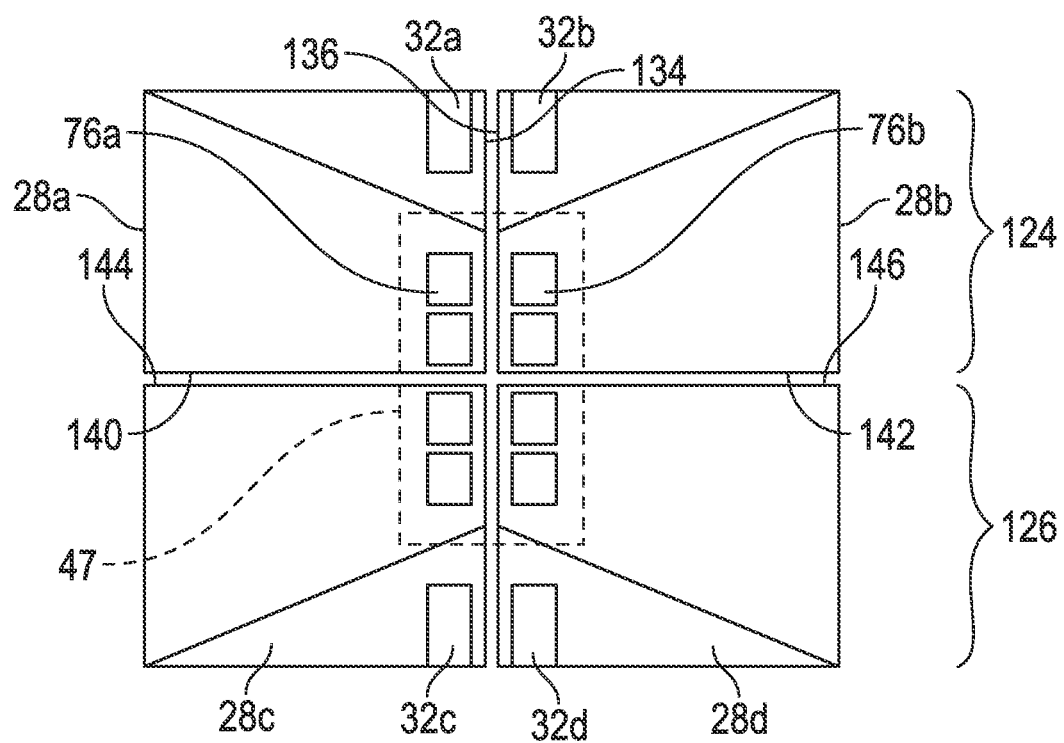
FIG. 8 is a bottom plan view of the four modular silos depicted in FIG. 7, according to an embodiment of the disclosure.

FIGS. 7 and 8 will now be described. FIG. 7 is a partial bottom perspective view of a cooperating unit 120 formed of four modular silos 28 arranged in a group and connected together, according to an embodiment of the disclosure. FIG. 8 is a bottom plan view of the cooperating unit 120 having the four modular silos 28 depicted in FIG. 7. The cooperating unit 120 is provided with a first group 124 of modular silos 28, and a second group 126 of modular silos 28. The first group 124 and the second group 126 are substantially identical and may be constructed to form mirror images of one another.

The first group 124 is provided with a first modular silo 28a and a second modular silo 28b. The second group 126 is provided with a third modular silo 28c and a fourth modular silo 28d. In general, the first modular silo 28a and the second modular silo 28b are similar in construction with the exception that the second modular silo 28b is a mirror image of the first modular silo 28a to permit feeders 76a and 76b to be positioned adjacent to each other and within the common area 47. The first and fourth modular silos 28a and 28d are similar to one another, and the second and third modular silos 28b and 28c are also similar to one another. The third and fourth modular silos 28c and 28d are similar in construction with the exception that the fourth modular silo 28d is constructed to be a mirror image of the third modular silo 28c.

For purposes of clarity, only the first group 124 will be described in detail. The first modular silo 28a is provided with a first housing side 134 positioned adjacent to a vertical conveyor 32a and the feeder 76a. The second modular silo 28b is provided with a first housing side 136 which is also positioned adjacent to a vertical conveyor 32b and the feeder 76b. The first housing sides 134 and 136 contact each other or are positioned in close proximity to neighbor each other. The feeders 76a and 76b are desirably positioned within 12 (3.6576 meters) feet of each other, and more desirably positioned within eight (2.4384 meters) feet of each other. In one embodiment, the feeders 76a and 76b are positioned adjacent to the first housing sides 134 and 136, e.g., desirably within six (1.8288 meters) feet of the first housing sides 134 and 136, and more desirably within four (1.2192 meters) feet of the first housing sides 134 and 136 such that the feeders 76a and 76b discharge the oilfield material into the hopper 79-1.

The first modular silo 28a is also provided with a second housing side 140 positioned adjacent to the vertical conveyor 32a and extending generally normal to the first housing side 134. The second modular silo 28b is also provided with a second housing side 142 which is also positioned adjacent to the vertical conveyor 32b and extending generally normal to the first housing side 136. When the first modular silo 28a and the second modular silo 28b are interconnected, as shown in FIGS. 7 and 8, the second housing sides 140 and 142 are in a co-planar relationship. The feeders 76a and 76b may be positioned adjacent to the second housing sides 140 and 142, e.g., within twelve inches of the second housing sides 134 and 136.

When the first group 124 of modular silos 28a and 28b are connected to the second group 126 of modular silos 28c and 28d, the second housing sides 140 and 142 extend parallel to the second housing sides 144 and 146 of the modular silos 28c and 28d.

The arrangement and components of formation fracturing system 20 may vary substantially depending on the parameters of a given fracturing operation. The modular silos 28 may be used individually or in groups of standalone silos or silos securely mounted on a support structure. The modular silos may be mounted at a sufficient height to direct outflowing oilfield material through an outflow feeder positioned at the bottom of the enclosed interior. In other applications, the feeders may be positioned to direct outflow of oilfield material from a higher compartment within the modular silo. In some applications, the modular silos may comprise an enclosed interior divided into a plurality of compartments for holding different types of oilfield material that may be selectively metered to a blender for blending into a desired mixture which is then pumped downhole into the wellbore.

Additionally, various belt conveyors or other types of conveyors may be enclosed to deliver oilfield material from the unload area to the upright, modular silos. The modular silos also may incorporate a variety of vertical conveyors for lifting the oilfield material to an upper discharge region of the modular silos. Various arrangements of upright silos enable storage of a substantial quantity of oilfield materials that may be readily supplied for use in a fracturing operation. The upright arrangement of modular silos also provides for an efficient use of wellsite space. In addition to the space efficiency, the enclosed system for storing and delivering oilfield material provides a clean wellsite substantially free of dust production. However, depending on the specifics of a given fracturing operation, various numbers and arrangements of modular silos, conveyors, blenders, and other wellsite equipment may be employed.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for handling oilfield materials, comprising:
  a plurality of modular silos, each modular silo disposed in a silo frame and being sized for over-the-road transport by a trailer, each modular silo having an outer housing supported by the silo frame, the outer housing and silo frame surrounding an enclosed interior for holding an oilfield material, a first inlet located at an upper portion of the enclosed interior, and a feeder through which the oilfield material is discharged from a lower portion of the enclosed interior to a common area for blending, the common area located below the outer housing, wherein each modular silo further comprises a mechanical vertical conveyor system having a second inlet configured to receive the oilfield material, wherein the second inlet is disposed at a lower portion of the mechanical vertical conveyor system, wherein the mechanical vertical conveyor system is configured to deliver the oilfield material into the upper portion of the enclosed interior at the first inlet located at the upper portion of the enclosed interior along a first enclosed pathway of the mechanical vertical conveyor system, and wherein the first enclosed pathway extends from the second inlet to a conveyor head of the mechanical vertical conveyor system;
  a modular support structure, each of the plurality of modular silos configured to be releasably mounted to the modular support structure, wherein the feeders of at least two of the modular silos of the plurality of modular silos are oriented to deliver the oilfield material to the common area for blending, the common area located above the modular support structure when the modular silo is releasably mounted to the modular support structure, and the outer housings of the modular silos overlapping the common area;
  a belt conveyor coupled to the second inlet of the mechanical vertical conveyor system of at least one modular silo via a lower end hopper, wherein the belt conveyor is positioned to deliver the oilfield material to the second inlet of the mechanical vertical conveyor system via the lower end hopper from an unload area, the belt conveyor having a horizontal portion overlapping with an inclined portion, the horizontal portion positioned in the unload area and configured to permit a truck to back over the horizontal portion, wherein the inclined portion of the belt conveyor comprises a second enclosed pathway from the unload area to the lower end hopper, and wherein the first enclosed pathway and the second enclosed pathway form an enclosed system for oilfield material from the unload area to the conveyor head of the mechanical vertical conveyor system.

2. The system as recited in claim 1, wherein the mechanical vertical conveyor system comprises a bucket elevator.

3. The system as recited in claim 1, wherein the plurality of modular silos comprises four silos coupled together.

4. The system as recited in claim 1, wherein the modular support structure supports the feeders of the modular silos at a sufficient height above the common area to allow a truck mounted portable blending system to be moved under the feeders of the modular silos and above the modular support structure.

5. The system as recited in claim 1, wherein the horizontal portion has a length in a range from 8 (2.4384 meters) feet to 51 (15.5448 meters) feet, and a height above the ground less than 12 inches.

6. The system as recited in claim 5, wherein the horizontal portion has a height in a range from 6 inches to 8 inches.

7. The system as recited in claim 1, wherein the plurality of modular silos include a first modular silo and a second modular silo, the outer housing of the first modular silo having a first housing side, and the outer housing of the second modular silo having a first housing side, the first housing sides of the first and second modular silos being adjacent to one another, and wherein the feeders of the first and second modular silos are adjacent to the first housing sides of the first and second modular silos.

8. The system as recited in claim 7, wherein the feeder of the first modular silo is spaced a first distance less than six (1.8288 meters) feet from the first housing side of the first modular silo.

9. The system as recited in claim 7, wherein the outer housing has a substantially rectangular configuration defining four corners, and wherein the feeder of the first modular silo is adjacent to one of the corners and within a quadrant defined by the outer housing.

10. The system as recited in claim 7, wherein the mechanical vertical conveyor system of the first modular silo has a first centerline extending from an additional lower portion of the outer housing to an upper portion of the outer housing, and the first housing side of the first modular silo has a second centerline extending from the additional lower portion to the upper portion of the housing, and wherein the first centerline is horizontally offset from the second centerline at the upper portion of the outer housing.

11. The system as recited in claim 10, wherein the first centerline is canted at an angle less than 5 degrees to parallel with the second centerline.

12. The system as recited in claim 10, wherein the first centerline is horizontally offset from the second centerline between two (0.6096 meters) feet and seven (2.1336 meters) feet at the upper portion of the outer housing.

13. A system for handling oilfield materials, comprising:
a modular silo configured to be releasably mounted to a modular support structure, comprising:
an outer housing disposed in a silo frame, the silo frame and the outer housing defining an enclosed interior, the outer housing having a lower portion and an upper portion, the outer housing also having a first inlet located at the upper portion of the outer housing;
a feeder configured to deliver oilfield material to a common area for blending, the common area located below the outer housing of the modular silo; and
a common mechanical conveyor of the modular silo comprising a second inlet to receive blendable oilfield materials at a lower portion, wherein the common mechanical conveyor comprises a conveyor head configured to deliver the blendable oilfield materials to the enclosed interior of the modular silo at the inlet at the upper portion of the outer housing, and wherein the common mechanical conveyor comprises a first enclosed pathway extending from the second inlet to the conveyor head; and
a belt conveyor coupled to the second inlet of the common mechanical conveyor, wherein the belt conveyor is positioned to deliver the oilfield material to the second inlet of the common mechanical conveyor from an unload area, the belt conveyor having a horizontal portion overlapping with an inclined portion, the horizontal portion positioned in the unload area and configured to permit a truck to back over the horizontal portion, wherein the inclined portion of the belt conveyor comprises a second enclosed pathway from the unload area to a lower end hopper, and wherein the first enclosed pathway and the second enclosed pathway form an enclosed system for oilfield material from the unload area to the conveyor head.

14. A system for handling oilfield materials, comprising:
a modular silo configured to be releasably mounted to a modular support structure and to deliver oilfield materials to a common area located below the modular silo, comprising:
an outer housing defining an enclosed interior, the outer housing having a lower portion and an upper portion, the outer housing having a first vertical centerline extending from the lower portion to the upper portion of the housing, the outer housing also having an inlet located at the upper portion of the outer housing; and
a bucket elevator extending from the lower portion of the outer housing to the upper portion of the outer housing, the bucket elevator having a second vertical centerline that is offset from the first vertical centerline, the bucket elevator having a material inlet disposed exterior to the modular silo and a discharge portion disposed adjacent the inlet of the outer housing in the enclosed interior of the modular silo, and the bucket elevator having an conveyor head to adjustably deliver oilfield material from the conveyor head to the enclosed interior of the modular silo, and the bucket elevator having a first enclosed pathway extending from the material inlet to the conveyor head; and
a belt conveyor coupled to the inlet of the bucket elevator, wherein the belt conveyor is positioned to deliver the oilfield material to the inlet of the bucket elevator from an unload area, the belt conveyor having a horizontal portion overlapping with an inclined portion, the horizontal portion positioned in the unload area and configured to permit a truck to back over the horizontal portion, wherein the inclined portion of the belt conveyor comprises a second enclosed pathway from the unload area to the inlet of the bucket elevator, and wherein the first enclosed pathway and the second enclosed pathway form an enclosed system for oilfield material from the unload area to the conveyor head.

15. The system of claim 14, wherein the outer housing has a top, and wherein the bucket elevator extends between one inch and fifteen (4.572 meters) feet beyond the top of the outer housing.

16. The system as recited in claim 14, wherein the second vertical centerline extends non-parallel with the first vertical centerline and within 5 degrees of parallel to the first vertical centerline to provide the offset from the first vertical centerline.

17. The system as recited in claim 14, wherein the second vertical centerline is horizontally offset between two (0.6096 meters) feet and seven (2.1336 meters) feet from the first vertical centerline.

18. The system as recited in claim 14, wherein the outer housing has a substantially rectangular shape defining four corners, and wherein the outer housing has a third vertical centerline extending from the lower portion to the upper portion of the housing such that the first and third vertical centerlines divide the housing into quadrants, and wherein the bucket elevator is adjacent to one of the corners and encompassed within one of the quadrants.

19. The system as recited in claim 13, wherein the common mechanical conveyor comprises a bucket elevator extending from the lower portion of the outer housing to the upper portion of the outer housing within the first enclosed pathway.

20. The system as recited in claim 13, wherein the outer housing of the modular silo has a substantially rectangular configuration defining four corners, and wherein the feeder of the modular silo is adjacent to one of the corners and within a quadrant defined by the outer housing of the modular silo.

21. The system as recited in claim 1, wherein the first and second enclosed pathways limit the escape of dust into the surrounding environment from the belt conveyor and the mechanical vertical conveyor system.

22. The system as recited in claim 13, wherein the first and second enclosed pathways limit the escape of dust into the surrounding environment from the belt conveyor and the common mechanical conveyor.

23. The system as recited in claim 14, wherein the first and second enclosed pathways limit the escape of dust into the surrounding environment from the belt conveyor and the bucket elevator.

\* \* \* \* \*